United States Patent [19]

Kelm

[11] Patent Number: 4,848,199
[45] Date of Patent: Jul. 18, 1989

[54] INDEXABLE CUTTING TOOL
[75] Inventor: Walter H. Kelm, Mt. Clemens, Mich.
[73] Assignee: Carboloy Inc., Warren, Mich.
[21] Appl. No.: 166,665
[22] Filed: Mar. 11, 1988

Related U.S. Application Data

[63] Continuation-in-part of Ser. No. 858,346, May 1, 1986, Pat. No. 4,730,525.

[51] Int. Cl.⁴ .............................................. B23B 29/00
[52] U.S. Cl. ....................... 82/159; 407/90; 407/112
[58] Field of Search ............. 82/36 A; 407/90, 104, 407/106, 112, 81, 82, 84, 99, 103; 408/35; 74/813 R, 813 L, 816, 817; 29/39, 48.5 R, 48.5 A

[56] References Cited

U.S. PATENT DOCUMENTS

| | | | |
|---|---|---|---|
| 4,408,507 | 10/1983 | Szewczyk | 82/36 A |
| 4,414,733 | 11/1983 | Janotik et al. | 82/36 A |
| 4,541,165 | 9/1985 | Sawai et al. | 82/36 A |
| 4,552,046 | 11/1985 | Dombroski et al. | 52/36 A |
| 4,730,525 | 3/1982 | Kelm | 407/90 |

Primary Examiner—Frederick R. Schmidt
Assistant Examiner—Lawrence Cruz
Attorney, Agent, or Firm—Hedman, Gibson, Costigan & Hoare

[57] ABSTRACT

A cutting tool having a cutting tool insert which is automatically rotationally indexable and including a shank and an indexable cutting tool insert rotatably connected to the shank, the insert including a plurality of cutting edges and side surfaces therebetween, the cutting tool is also provided with an indexing device, lock pin, cam plate and eccentric cam pin, wherein the indexing device comprises a sliding key and a pair of indexing legs attached thereto for engaging a serrated portion of the lock pin to which the cutting tool insert is attached for indexing the insert on the lock pin upon rotation of the cam pin which effects a lateral movement of the cam plate along the longitudinal axis of the shank whereby the cam plate engages the sliding key causing it to also move laterally to engage the indexing legs on the lock pin and the cutting insert attached thereto.

23 Claims, 12 Drawing Sheets

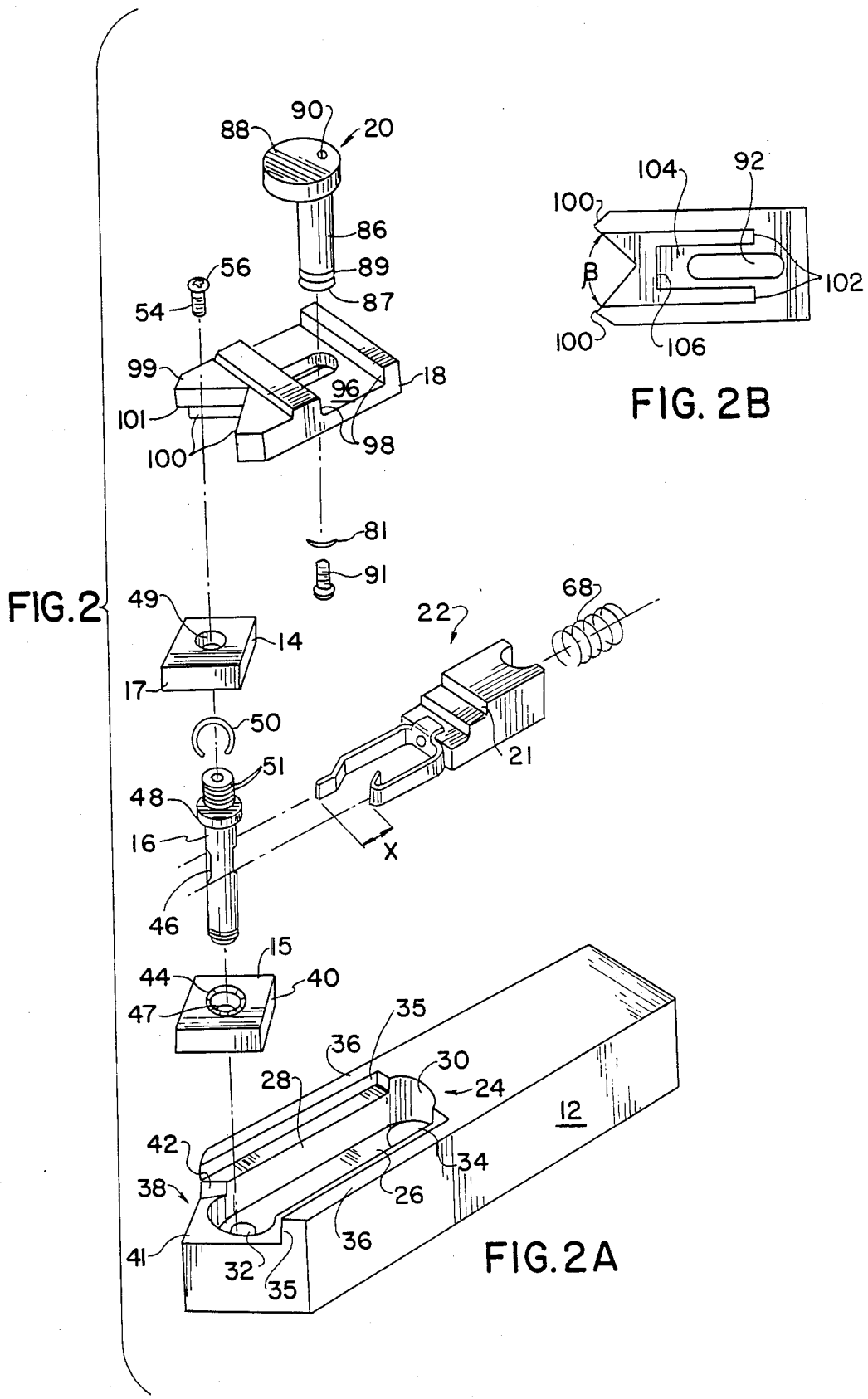

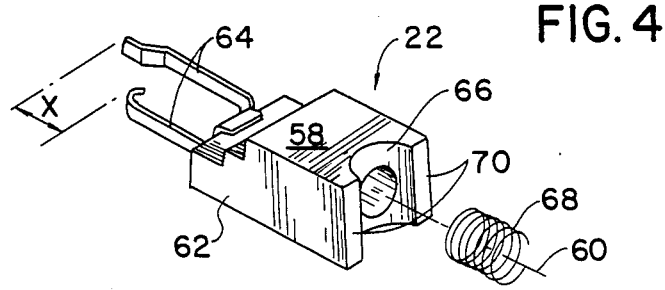
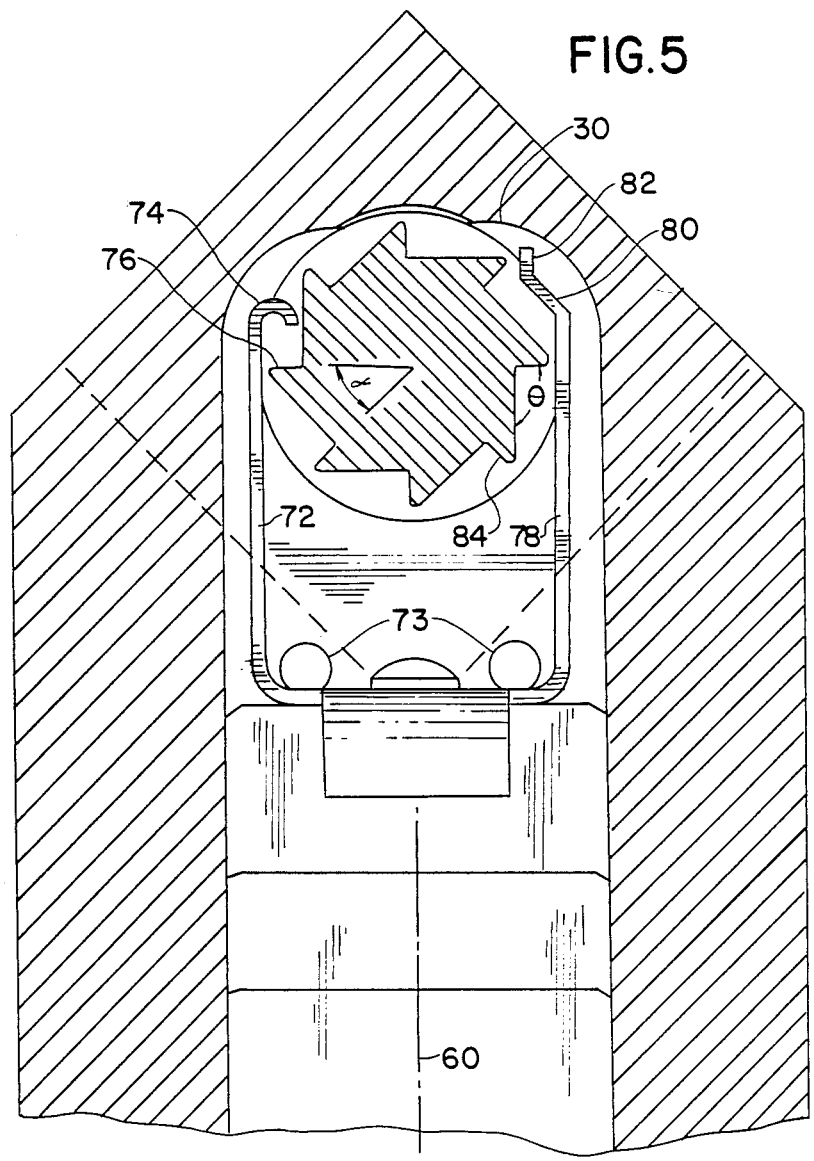

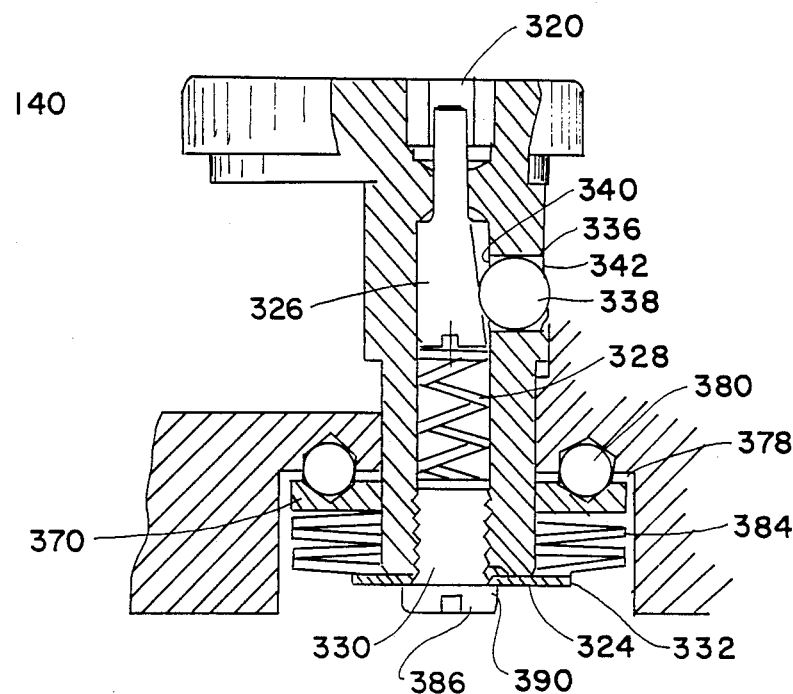
FIG.15
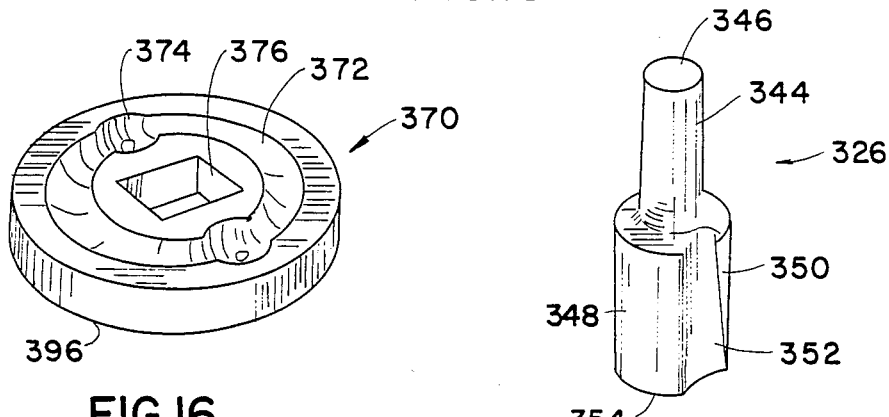
FIG.16
FIG.17
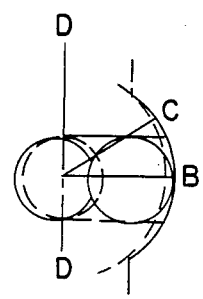
FIG.18

INDEXABLE CUTTING TOOL

This is a continuation-in-part application of pending allowed application U.S. Ser. No. 858,346 filed on May 1, 1986

FIELD OF THE INVENTION

This invention relates generally to a tool holder and more particularly to an adjustable tool holder for securing and indexing cutting inserts in a pocket of the cutting tool.

BACKGROUND OF THE INVENTION

Cutting tools used in metal cutting machines such as lathes, drills, milling machines and the like, are frequently formed with a removable and replaceable cutting tool insert made of a hardened material such as high speed steel, carbide or ceramic, mounted upon the tool holder. The inserts are generally formed having rectangular, triangular, diamond or circular cross-sectional configurations. Such inserts are formed with a number of cutting edges so that when one edge becomes worn the insert may be rotationally indexed to present a new cutting edge. When all the edges of a insert are worn, the insert is replaced.

Conventionally, such indexing of a cutting tool insert has been performed either manually or by relatively complex indexing means. Typically when a cutting edge of an insert has been used or worn the machining operation is temporarily suspended, the insert is loosened on its holder, then turned to present a new cutting edge to the work piece, accurately positioned, and then retightened on the holder. Indexing of a cutting tool insert, therefore results in an undesirable loss of operating time.

Furthermore, with the advent of computer-aided manufacturing systems, improved means for indexing tool inserts with increased speed while maintaining accuracy of position is desirable.

One attempt at providing an indexable cutting tool is disclosed in U.S. Pat. No. 4,552,046 (Dombrowski et al). In this patent a cutting tool insert is automatically indexed by means of a shaft and slideable member attached to the tool holder. The slideable member engages a point of the insert and pushes it in a rotational manner until the next insert point is in the cutting position. The insert is locked in position using one surface of the insert against the sliding member. This device, while providing for automatic indexing of the insert provides only one locking surface for the insert thereby making it susceptible to loosening during operation.

Thus, there is a need for a cutting tool having an insert which may be automatically rotationally indexed while providing an improved securing means for the insert to prevent both loosening and damage to the workpiece during operation.

SUMMARY OF THE INVENTION

In accordance with the present invention, there is provided a cutting tool having a cutting tool insert which is automatically rotationally indexable. The cutting tool includes a shank and an indexable cutting tool insert rotatably connected to the shank. The insert includes a plurality of cutting edges and side surfaces therebetween. The cutting tool is also provided with an indexing means, lock pin, cam plate and eccentric cam pin.

The indexing means comprises a sliding key and a pair of metal legs connected thereto for engaging a serrated portion of the lock pin to which the cutting tool insert is attached.

The indexing means is effective for indexing the insert on the lock pin upon rotation of the cam pin which effects a lateral movement of the cam plate along the longitudinal axis of the shank whereby the cam plate engages the sliding key causing it to also move laterally to engage the indexing legs on the lock pin resulting in rotation of the lock pin and the cutting insert attached thereto.

In a preferred embodiment, the cutting tool comprises a shank with a cavity provided in the top and at one end for receiving the sliding key. Extending through the shank in a direction perpendicular to the longitudinal axis of the shank is a first bore for receiving the lock pin therethrough, and a second bore for receiving the cam pin therethrough. The lock pin is adapted to extend through the bore so that the serrated portion of the lock pin is positioned in the cavity of the shank. The cam plate is positioned on top of the shank above the sliding key and is provided with a pocket at one end for engaging and locking the cutting tool insert. An elongated longitudinal bore is provided in the cam plate to allow the cam pin to pass through. The cam plate is further provided with a lateral slot having a breadth equal to the diameter of the cam pin head.

In a preferred from of the invention the lock pin has a screw means insertable into the insert end of the lock pin which is adapted to engage and urge the cutting insert against the walls of the pocket.

A locking system is also provided at the opposed end of the lock pin to both secure the lock pin within the first bore and for urging the cutting insert against the insert seat and the insert seat against the base of the pocket to thereby secure the entire cutting insert assembly in place during machining operations.

The cam pin is positioned in the elongated bore of the cam plate and through the second bore of the shank in a position abutting one end of the sliding key. The cam pin head is nestled in the lateral slot of the cam plate and is provided with a tool recess for rotating the cam pin. Alternatively, the cam pin head is placed in a ring which has an upper region having the cam pin head nestled therein and a lower portion adapted to be slidably mounted within the lateral slot. The cam pin is secured in this position by a fastening means at the base of the shank.

In a preferred form of the invention, the cam pin has therein a spring loaded pin which is activated by inserting a drive means in an axial hole in the head of the cam pin. The spring loaded pin has a groove angled outwardly from top to bottom and together with the inner surface of the stem of the cam pin forms an elongated tapered cavity for housing a bearing.

The bearing is fully contained within the cavity when the spring loaded pin is depressed by the drive means to enable the cam pin to freely rotate to thereby induce the next indexing position of the cutting insert. When the drive means is released and the spring loaded pin rebounds-to its non-depressed position, the bearing is forced radially from the axis of the cam pin to a position partially outside of the cam stem. In this position the bearing lockingly engages a lateral groove in the shank to prevent further rotation of the cam pin.

In addition, a preferred embodiment of the cam pin may be provided with a unique locking system which both secures the cam pin in the second bore and also provides means for the user to readily detect when the cam pin has been rotated to the position where the cutting insert is precisely located by the cam plate.

The cutting tool which utilizes the present invention, can be provided with a number of different types of cutting tool inserts and corresponding pockets incorporated in the cam plate for engaging and securing the cutting tool insert.

The cutting tool insert includes a central aperture and is positioned on a seat held by the lock pin. The cutting tool insert is positioned in the pocket of the cam plate with two of its side surfaces adapted to be held against the walls of the pocket by the action of the cam pin. When it becomes necessary to change the cutting edge of the insert, i.e., index the insert, a tool is inserted in the cam pin head and the cam pin is rotated approximately 310° or 330°. The action of the cam pin head or the ring in which the cam pin head is nestled against the lateral slot of the cam plate results in a translation of the cam plate in a direction parallel to the longitudinal axis of the shank. In the first 180° of rotation of the cam pin the cam plate engages and translates the sliding key in the longitudinal direction away from the insert causing one indexing leg to engage the serrated portion of the lock pin thereby partially rotating the lock pin. As the cam pin continues to be rotated, the longitudinal translation of the cam plate is reversed causing the sliding key to finger engages the serrated portion of the lock pin to complete the necessary rotation of the cutting insert.

Further rotation of the cam pin causes the pocket of the cam plate to engage and secure the cutting tool insert.

BRIEF DESCRIPTION OF THE DRAWINGS

The following is a detailed description together with the accompanying drawings of illustrative embodiments of the invention wherein like reference characters indicate like parts. It is to be understood that the invention is capable of modification and variation apparent to these skilled in the art within the spirit and scope of the invention.

FIG. 2A is an exploded perspective view of the cutting tool and indexing means assembly of FIG. 1 for automatically indexing a cutting tool insert according to the present invention.

FIG. 2B is a bottom view of the cam plate shown in FIG. 2A.

FIG. 4 is a perspective view of a sliding key for indexing the cutting tool insert according to a preferred embodiment of the present invention.

FIG. 5 is a sectional-elevational view, taken along line 5—5 of FIG. 1.

FIG. 15 is a cross-sectional view of the cam pin and the shank showing the securing and rotational control means.

FIG. 16 is a perspective view of the raceway plate shown in FIG. 14.

FIG. 17 is a perspective view of the spring loaded pin shown in FIG. 14.

FIG. 18 is a schematic view of the relative movement of the bearing which interfaces with the spring loaded pin during movement of the cam pin from a rotating position to a locked position.

DETAILED DESCRIPTION OF THE INVENTION

Figure 1:
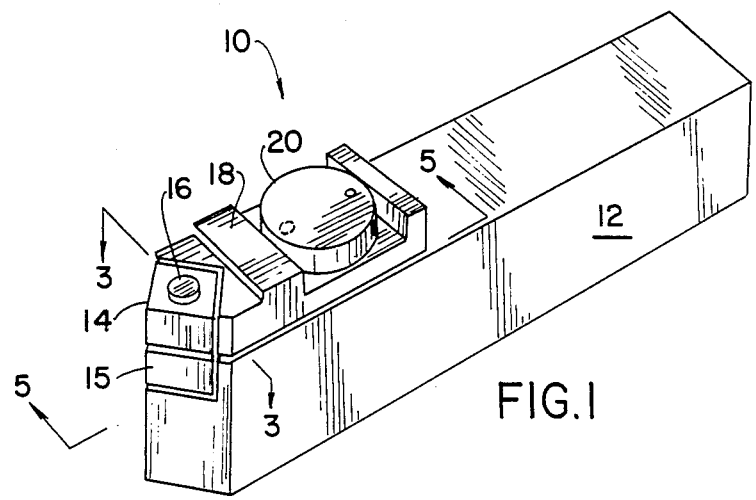
FIG. 1 is a perspective view employing a preferred embodiment of a cutting tool having means for automatically indexing a cutting tool insert according to the present invention

Referring to the drawings and first to FIG. 1, there is shown a preferred embodiment of a completely assembled cutting tool 10 having an elongated shank or tool holder 12 which may be removably mounted in a cutting machine such as, for example, a lathe, drill or milling machine (not shown). The tool 10 also includes an exemplary indexable square cutting tool insert 14, rotatably mounted at one end of the shank 12 on a lock pin 16 and supported on a fixed seat 15. The insert 14 is conventional and may be employed in a number of shapes including square, triangular, diamond, round or any other peripheral shape. The insert 14 may be made of any conventional cutting tool materials such as, high speed steel, carbide, ceramic or other known compositions.

As shown in FIGS. 1, 2A and 2B the cutting tool 10 of the present invention also includes means for indexing the insert including a sliding key 22 having means for rotating the lock pin 16, a cam plate 18 for engaging the sliding key 22 and locking the insert 14, and a cam pin 20 adapted to be rotated for moving the cam plate 18.

Details of the cutting tool are more particularly illustrated in the exploded view of FIGS. 2A and 2B. As shown, the shank 12 includes a cavity 24 disposed generally along the longitudinal axis of the shank 12, having a bottom wall 26 and open at the top for receiving the sliding key 22. The cavity 24, includes opposing walls 28 and substantially curved end walls 30 which are essentially vertical and are of a height sufficient to receive a substantial portion of the sliding key 22.

Disposed in the bottom wall 26 of the cavity 24 and vertically extending through the shank 12 are a first bore 32 for receiving the lock pin 16 and a second bore 34 for receiving the cam pin 20.

In the preferred embodiment of FIG. 2A, the shank 12 also includes a top surface 36 bordered by walls 35 for supporting the cam plate 18 which slides in the direction of the longitudinal axis of the shank 12. The head or cutting end of the shank 12 has a cut-out 38 adapted to receive the insert seat 15. Depending on the shape of the seat 15, the cut-out 38 is configured so that the side surfaces 40 of the seat may extend slightly beyond the periphery of the shank 12. Surfaces 41 and 42 of the cut-out 38 should be perfectly flat, within the usual acceptable tolerances, and extend perpendicular to each other. Two surfaces 40 of the seat 15 are held loosely against vertical surfaces 42 of the cut-out 38 by means of the lock pin 16 which extends through a central aperture 44 in the seat 15 so that shoulder 48 rests on counterbore 47 and through the first bore 32 in the shank 12. The lock pin 16 may be rotatably secured to the base of the shank 12 by conventional means, e.g., diametrical groove and oval retaining clip, or preferably by novel securing means as described hereinafter.

Figure 3:
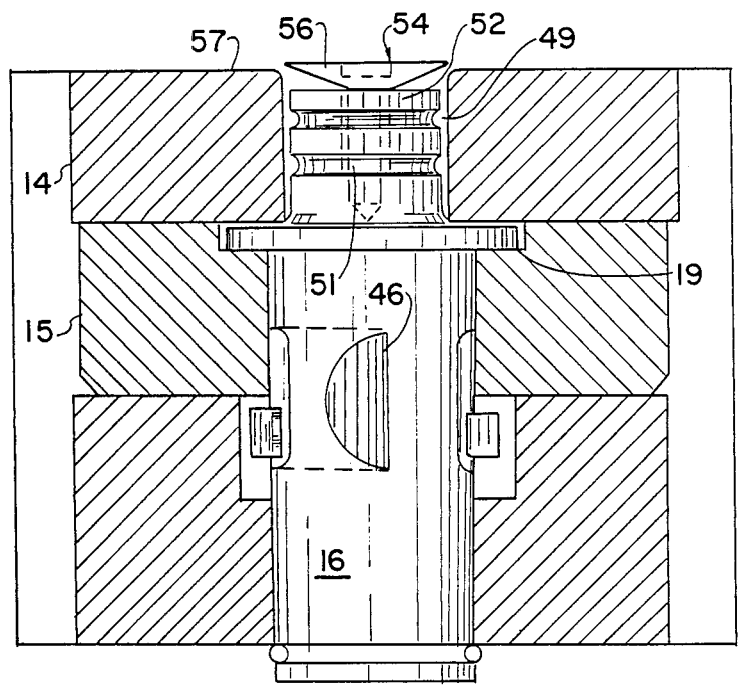
FIG. 3 is a sectional view, taken along line 3—3 of FIG. 1.

Details of the lock pin 16 are more particularly illustrated in FIG. 3, which depicts the lock pin 16, seat 15 and insert 14 completely assembled in the tool holder 10. As shown, the lock pin 16 is generally cylindrical in shape and includes a serrated portion 46 about the circumference of the pin 16 and at the elevation of the cavity 24 of the shank 12 when the lock pin 16 is installed in the first bore 32. A shoulder 48 is provided about the periphery of the lock pin 16 for engaging the lock pin 16 on a circumferential lip 19 in the seat 15. The cutting insert 14 is positioned on the seat 15 by extending the lock pin 16 through a central aperture 49 in the insert. The insert 14 may be secured to the lock pin 16 by means of one or more oval clips 50 inserted about grooves 51 in the lock pin 16. The oval clips 50 have a major diameter sufficient to hug the inside diameter of the central aperture 49 of the insert 14, while the minor diameter of the clip 50 hugs the diameter of the groove 51. Alternatively, and preferably, the top of the lock pin 16 is formed with a threaded hole 52 extending along the axis of the lock pin 16 for receiving the shank of a screw 54 having a cylindrical head 56 with a diameter greater than that of the central aperture 49. With the insert 14 thus positioned on the lock pin 16, the screw 54 is threaded into hole 52 until the head 56 is seated against a countersink 57 in the insert 14, thereby securing the insert 14 against the shoulder 48 of lock pin 16.

Referring to FIG. 4, the sliding key 22 comprises a body 58 having a longitudinal axis 60, parallel side walls 62, a pair of spring indexable legs 64 affixed to one end of the key 22 and a vertical recess 66 at the other end of the key 22 having a radius of curvature effective for accomodating the cam pin 20 when the cam pin 20 is inserted through the second bore 34 of the shank 12. The sliding key 22 also includes a coil spring 68 which is positioned within a longitudinal bore 70 in the key 22.

The lateral breadth of the key 22 is of sufficient width so as to provide a close fit between the side walls 62 of the sliding key 22 and the side walls 28 of the cavity 24.

The indexable legs 64 extending from the body 58 of the sliding key 22 are substantially parallel and extend about the serrated portion 46 of the lock pin 16 in the cavity 24. The lengths of the two indexable legs 64 differ by an amount X which is a function of the shape of the insert 14 the number of teeth included in the serrated portion 46 and diameter of the lock pin 16.

Details of the cutting tool 10, cavity 24, sliding key 22 and lock pin 16 are more particularly illustrated in FIG. 5 which is a cross-sectional view through line 5—5 of FIG. 1. The shorter indexable leg 72 is provided with a hook like end 74 for engaging a first tooth 76 of the serrated portion of the lock pin 16 when the sliding key 22 is made to travel along its longitudinal axis 60 away from the lock pin 16 thereby effecting an angle of rotation, e.g., 45° in the case of an insert having four cutting edges. The longer indexable leg 78 is jogged axially so as to provide an inclined ramp 80 to avoid interfering with the serrated portion 46 when key 22 slides away from the lock pin 16 and an engaging member 82 for engaging a second tooth 84 of the lock pin 16 when the key 22 is retracted toward the lock pin 16 thereby effecting the necessary rotation of the lock pin 16 with the insert 14 attached thereto.

A pair of stop pins 73 are provided in the shank 12 in front of the sliding key 22 to prevent the indexable legs 72 and 78 from contacting the end wall 30 of the cavity 24 during retraction of the sliding key 22.

As shown in FIG. 5, the included angle between the serrated teeth is generally 90° in the case of an eight-tooth serrated section 46. The angle may be more or less depending on the shape of the insert 14, i.e., the number of surfaces and cutting edges provided on the insert 14. The angle may also be greater or less than 90° to improve the action between the teeth of the serrated portion 46 and the indexable legs 72 and 78, specifically engaging hook 74 and member 82.

Referring again to FIG. 2, the cam pin 20 comprises a cylindrical shaft 86 and a cylindrical head 88 eccentrically attached to the top of the shaft. A turning means 90 is disposed in the head 88 at a position in alignment with or parallel to the longitudinal axis of the shaft 86. Upon passing the cam pin 20 through the cam plate 18 and the second bore 34 the cam pin 20 may be rotatably secured to the base of the shank 12 by means of an oval bowed spring retaining clip inserted in groove 89 or by any other conventional means, or preferably by novel securing means described hereinafter.

One such conventional means is the use of at least one spring clip 89 affixed by a screw means 91 to a threaded hole 87 at the end of the cam pin 20. The assembly of disc springs 89 is nested within a counter-bore in the base of the shank 12. The disc springs not only retain the cam pin 20 in the shank 12 but are designed so as to create a drag between the cam pin head 88 and the cam plate 18 and the shank 12 to prevent inadvertent insert loosening during the cutting operation.

The cam plate 18 in one embodiment shown in FIGS. 2A and 2B and comprises a central elongated slot 92 disposed substantially parallel to the longitudinal axis of the plate 18. The cam plate 18 also includes a lateral groove 96 defined by opposing side walls 98 against which the cam pin head 88 rotatably and slidingly engages. At one end of the cam plate 18, a pair of shoulders 100 are provided at an angle B for engaging and securing the cutting tool insert 14 on the seat 15 of the cutting tool 10.

The shoulders 100 may be provided with a taper extending downwardly and inwardly from the top surface 99 of the cam plate 18 to the bottom edge 101 of the shoulders 100. The tapered shoulders 100 ensures that the cutting insert 14 will contact the seat 15 securely at the cutting edge.

Although the preferred embodiment of the present invention employs a pair of shoulders 100 to engage and secure the cutting tool insert 14, the invention is not limited to this embodiment. For instance, a single shoulder 100 may be feasible to secure the insert 14 provided adequate force is applied between the shoulder 100 and the insert 14 and provided minimum insert movement during the cutting operation is not objectionable.

The angle $\beta$ is manufactured to preferably be slightly less (e.g., up to about 2°) than the angle formed by the side surfaces 17 of the cutting insert 14, i.e., for a square insert $\beta$ is 90°, for a triangular insert $\beta$ is 60°, etc. In the embodiment illustrated in FIG. 2B a 90° angle is illustrated for a square insert and so the angle $\beta$ may preferably be in the range of from about 88° to up to but not including 90°. The included angle $\beta$ can be manufactured to tolerances of +0 degrees to 2 degrees.

The cam plate 18 is also provided with opposing longitudinal tracks 102 which are of a width equal to the width of the top surface 36 of the cavity 24 (FIG. 2B). When assembled the tracks 102 ride between the opposed walls 35 and along the top surface 36 thereby allowing the cam plate 18 to translate only in a direction substantially parallel to the longitudinal axis of the shank 12. The cam plate 18 is further provided with a rib-like key 104 defined by the longitudinal tracks 102 and lateral wall 106 for engaging an upper shoulder 21 of the sliding key 22 during the indexing operation. When assembled, the cam pin 20 passes through the elongated slot 92 and through the second bore 34 at a position in the cavity 24 behind the sliding key 22. The spring 68 is disposed between the cam pin 20 and in the longitudinal bore 70 of the recess 66 in the sliding key 22 and exerts a force on the sliding key 22 away from said cam pin 20. This is the compression force necessary to move the sliding key 22 to the left during the indexing of the insert 14.

The operation of the cutting tool indexing means shown in FIGS. 1–5 is, more particularly illustrated in the sequence shown in FIGS. 6A–6E which depicts the actions of the internal indexing mechanism, i.e., sliding key 22 and lock pin 16 and the sequence shown in FIGS. 7A–7E which depict the operation of the cam pin 20, cam plate 18 and a square insert 14 during the indexing steps.

Figure 6A:
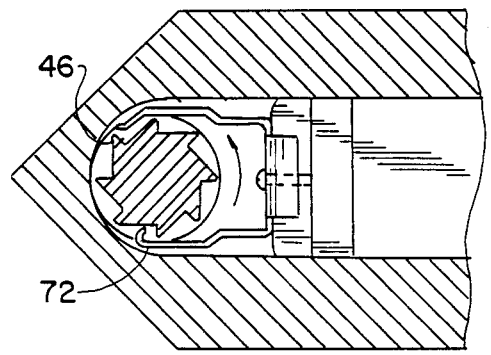
FIGS. 6A-6E illustrate a sequence of positions of the internal components of the cutting tool which occurs during indexing of the cutting tool insert.
Figure 6B:
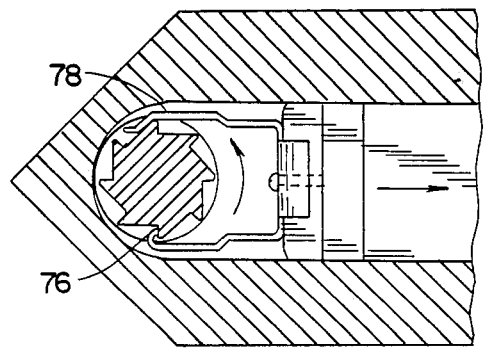
Figure 7A:
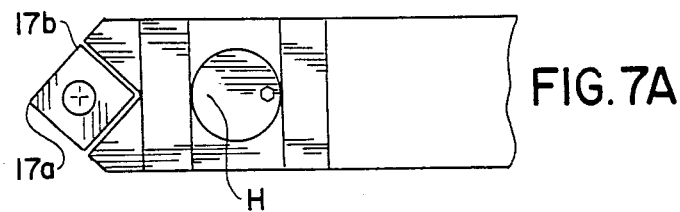
FIGS. 7A-7E illustrate a sequence of positions of the cutting tool which occurs during indexing of the cutting tool insert.
Figure 7B:
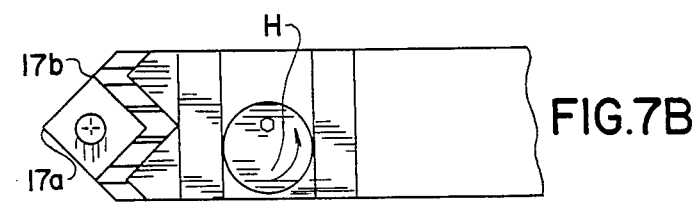

FIGS. 6A and 7A illustrate the sliding key 22 and the cam plate 18, respectively in their home positions. As seen in FIG. 6A the sliding key 22 does not engage the serrated portion 46 of the lock pin 16 in the home position. Correspondingly, in FIG. 7A cam plate 18 locks and secures the insert 14 in a pocket formed between the shoulders 100. In this alignment insert edge 17a is in the cutting position and the high point of the cam head 88 indicated by H is substantially adjacent the cutting insert 14 when it becomes necessary to index the insert 14, i.e. to replace a worn cutting edge, an appropriate tool (not shown) is inserted into the turning means 90 of the cam pin 20 and a torque is applied to the cam 20. In FIG. 7B, the cam pin 20 has been rotated about 90° as indicated by the new position of high point H.

The cam pin 20 rotation results in a translation of the cam plate 18 to the right to allow clearance for rotation of the insert 14. Correspondingly, the first 90° rotation of the cam pin 18 results in a translation of the sliding key 22 to the position indicated by FIG. 6B. As seen, the hook like member 74 of the shorter indexable leg 72 is in position to engage a first tooth 76 of the serrated portion 46 of the lock pin 16.

Figure 6C:
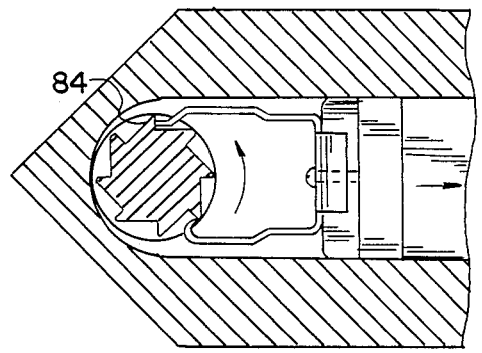
Figure 6D:
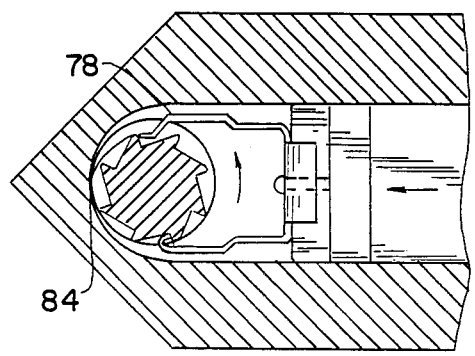
Figure 6E:
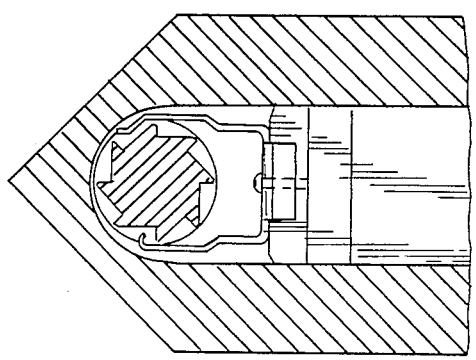
Figure 7C:
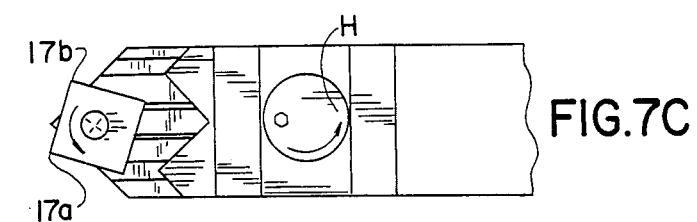

In FIG. 7C, the cam pin 20 has been rotated an additional 90° and the square insert 14 has been correspondingly rotated about 45° in the counterclockwise use direction. The insert rotation is accomplished by the continued axial translation of the sliding key 22 and the indexable leg 72 in engagement with the tooth 76. (FIG. 6C)

Figure 7D:
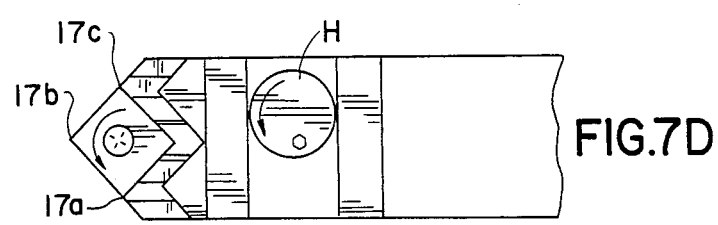

In FIG. 7D, the cam pin 20 has been rotated an additional 90° and the square insert 14 has been correspondingly rotated an additional 45° thereby effecting a total 90° rotation of the insert 14 to present a new cutting edge 17b at the cutting position in place of the worn cutting edge 17a. As seen, in FIG. 6D the direction of translation of the cam plate has been reversed during the last 90° rotation of the cam pin 20. Correspondingly, the translational direction of the sliding key 22 has also reversed by the action of spring 68 (not shown) resulting in the engagement of the longer indexable leg 78 with a second tooth 84 of the serrated portion 46 of the lock pin 16 thereby continuing the counterclockwise rotation of the lock pin an additional 45°.

Figure 7E:
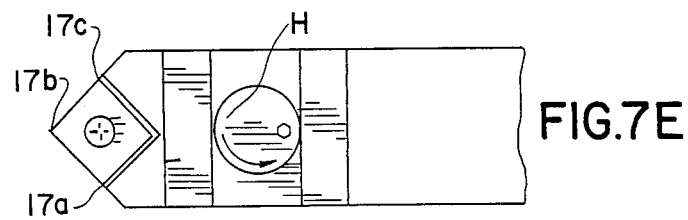

FIG. 7E illustrates the final rotation of the cam pin 20 to its home position where the shoulders 100 of the cam plate 18 lock and secure the cutting insert 14 with the new cutting edge 17b in the cutting position. Correspondingly, in FIG. 6E the sliding key 22 is translated to its home position to disengage the indexing legs 64 from the serrated portion 46 of the lock pin 16. The above described sequence of steps illustrated in FIGS. 6 and 7 can be repeated over and over again depending on the number of cutting edges on the insert 14.

The cam pin rotation must be reversed for each successive indexing step due to the fact that the cam pin 18 rotates only about 310° and not 360°. The 50° lost rotation is necessary to provide wedging force of the cam pin head 88 against the side walls 98 of the lateral groove 96 to lock the insert 14 between the shoulders 100.

An alternative means of indexing the insert 14 is to rotate the cam pin 18 one-half turn in one direction, e.g. clockwise, followed by one-half turn in the opposite direction, e.g. counterclockwise. The two half-turns of the cam pin 18 results in a complete withdrawing and retracting step of the cam plate 18 and the sliding key 22 resulting in one complete indexing of the cutting insert 14 as shown in FIGS. 8A–8D.

Figure 8A:
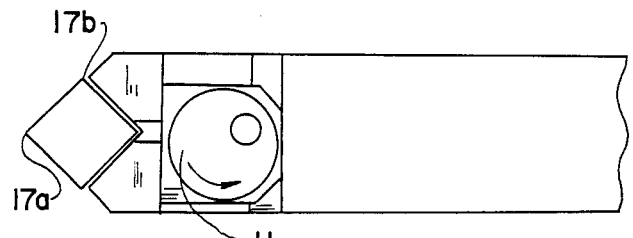
FIGS. 8A-8D illustrate an alternative sequence of positions of the cutting tool by clockwise and then counterclockwise rotation of the cam pin.
Figure 8B:
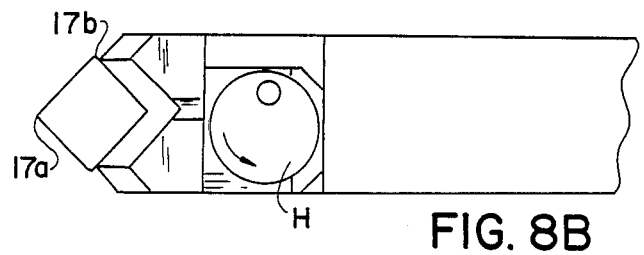
Figure 8C:
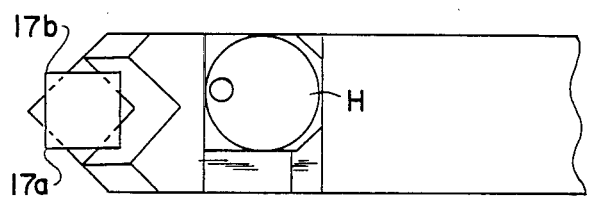

Referring to FIGS. 8A–8D, the high point H of the cam head 88 is in the starting position as shown in FIG. 8A. As the cam head 88 is rotated about 90° in the counterclockwise direction toward the position shown in FIG. 8B, the cam plate 18 is retracted. As shown in FIG. 8C, another 90° counterclockwise rotation causes the cutting insert 14 to rotate to remove cutting edge 17a in favor of cutting edge 17b.

Figure 8D:
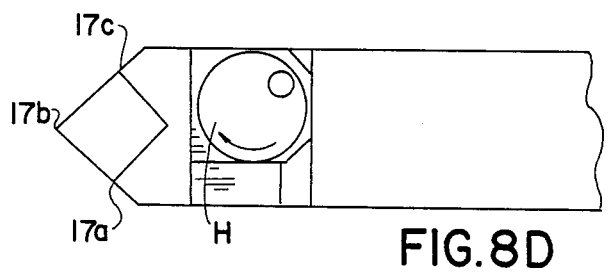

Customary means are provided for preventing further rotation of the cam head 88 in the counterclockwise direction after 180° of rotation. When the cam head 88 is then rotated in the reverse or clockwise direction to its original position as shown in FIG. 8D, the cam plate 18 is secured against the cutting insert 14 with the cutting edge 17b in the cutting position.

The cam head 88 may be prevented from further rotation by the use of a stop (not shown) positioned on the cam head 88 or the,. cam plate 18 which is actuated when the cam head is in the position shown in FIG. 8C. The rotation sequence shown in FIGS. 8A-8D is employed in order to prevent overtightening of the cam plate 18 against the cutting insert 14.

Accordingly, it will appreciated that the cutting tool 10 including the indexing means acting directly on the insert 14 in accordance with the present invention provides a relatively simple arrangement for indexing and locking the insert 14 which is readily adaptable to computer-aided automatic indexing tools.

Figure 9:
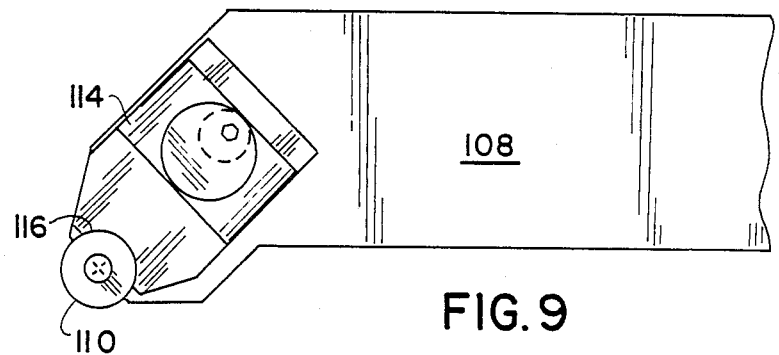
FIG. 9 is a plan view of an alternate embodiment of the present invention incorporating a round cutting tool insert.
Figure 10:
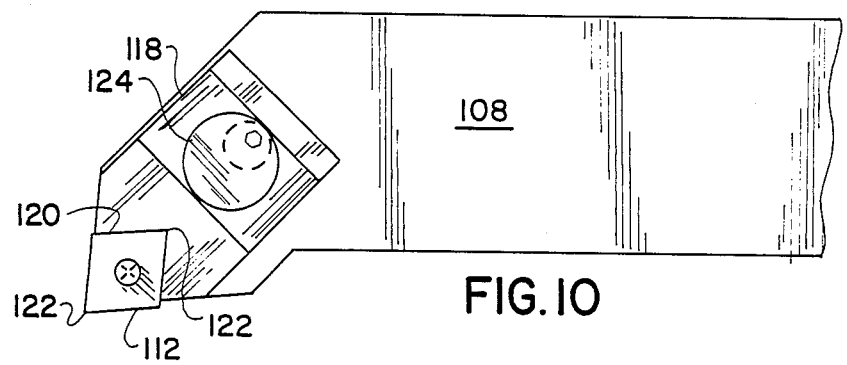
FIG. 10 is a plan view of an alternate embodiment of the present invention incorporating a diamondshaped cutting tool insert.

Illustrated in FIGS. 9 and 10 are alternative embodiments of the present invention incorporated in a side cutting tool holder 108 including a round-shaped cutting insert 110 and a diamond-shaped cutting insert 112, respectively. In FIG. 9, the cam plate 114 includes rounded shoulders 116 to correspond to the radius of curvature of the cutting insert 110. Similarly, in FIG. 10, the cam plate 118 includes shoulder 120 having an included angle less than 90° to correspond to the acute angle of the diamond-shaped insert 112. As evidenced from the cutting tool 108 of FIG. 10, the diamond-shaped cutting insert 112 has four side surfaces but only two opposing cutting edges 122. Thus, to index the insert 112, two rotations of the cam pin 124 are necessary to effect a 180° rotation of the insert to present a new cutting edge in the cutting position.

Furthermore, the cam plates 114 and 118 in the embodiments of FIGS. 9 and 10 are translated in a direction which is no longer parallel to the longitudinal axis of the shank 108. The translation occurs in a plane coincidental with the plane bisecting the included angle of the shoulders and insert.

Figure 11:
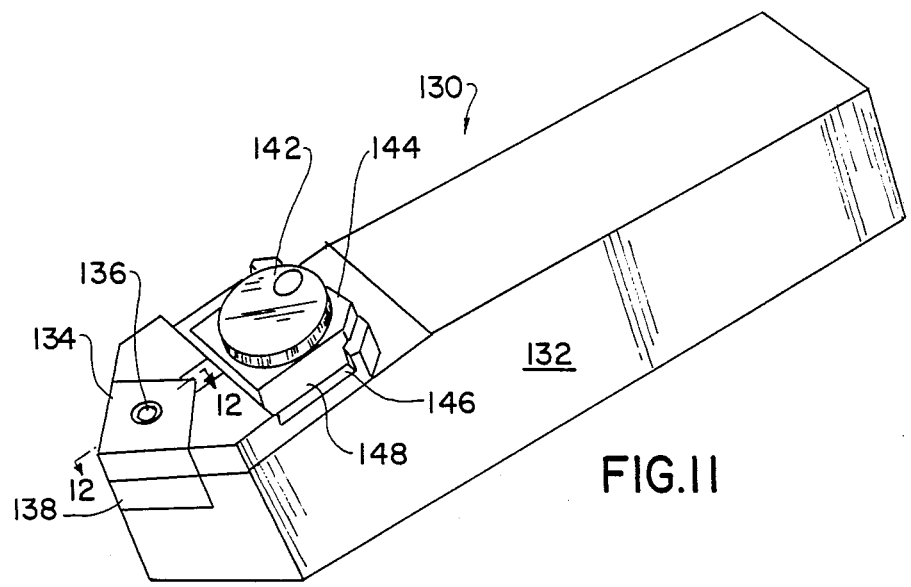
FIG. 11 is a perspective view employing another preferred embodiment having means for automatically indexing a cutting tool insert according to the present invention.
Figure 12:
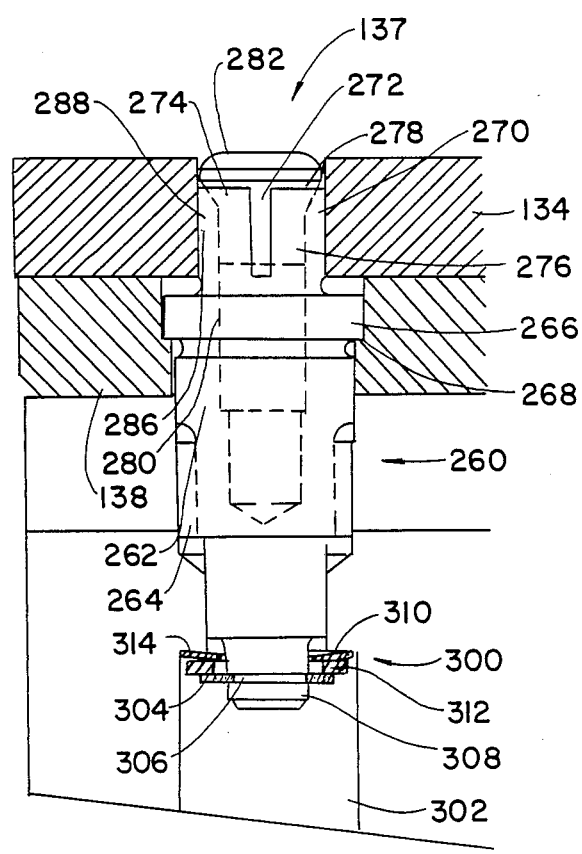
FIG. 12 is a cross-sectional view taken along line 12—12 of FIG. 11 showing a preferred lock pin assembly.
Figure 13B:
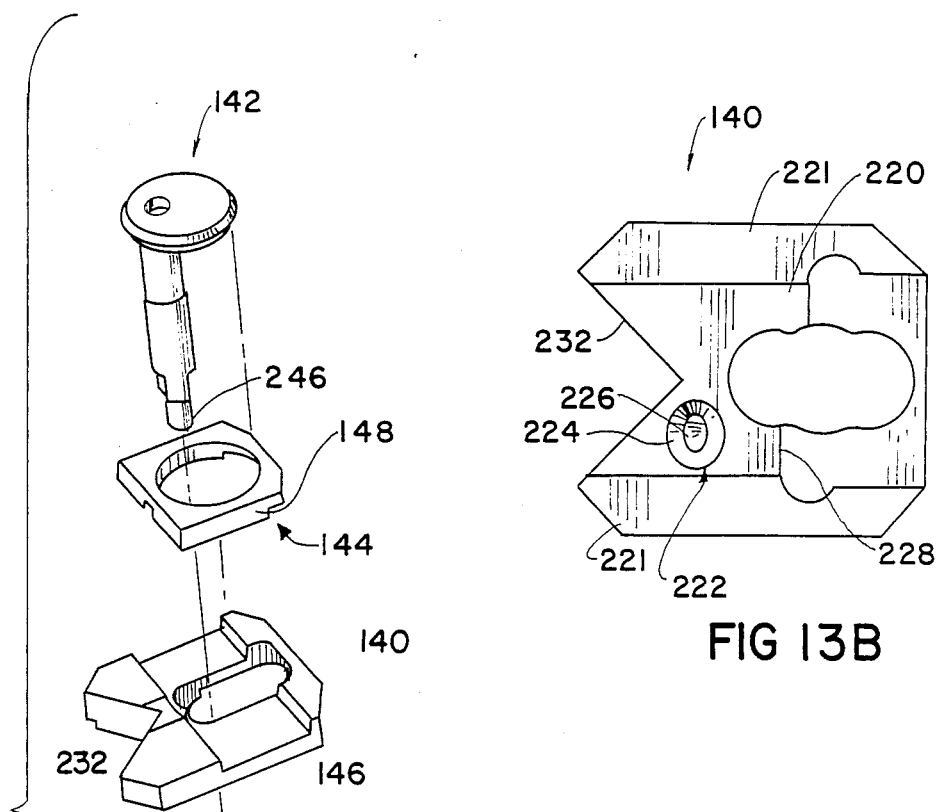
FIG. 13B is a bottom view of the cam plate shown in FIG. 13A.
Figure 13E:
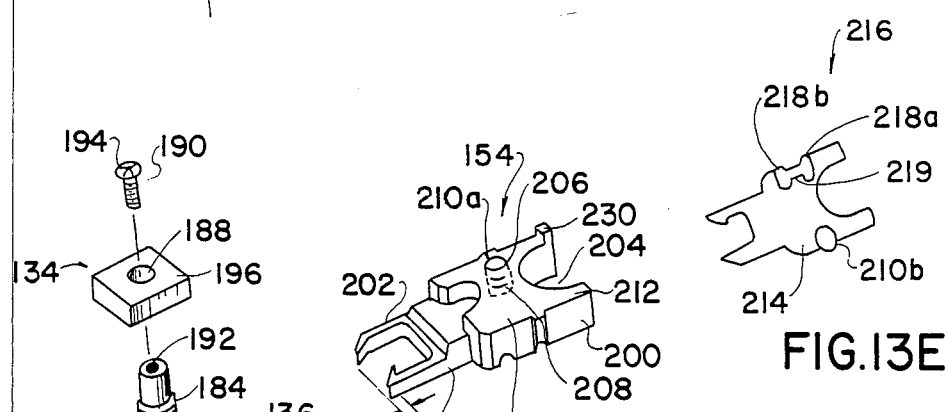
FIG. 13E is a bottom view of the sliding key shown in FIG. 13A.
Figure 13A:
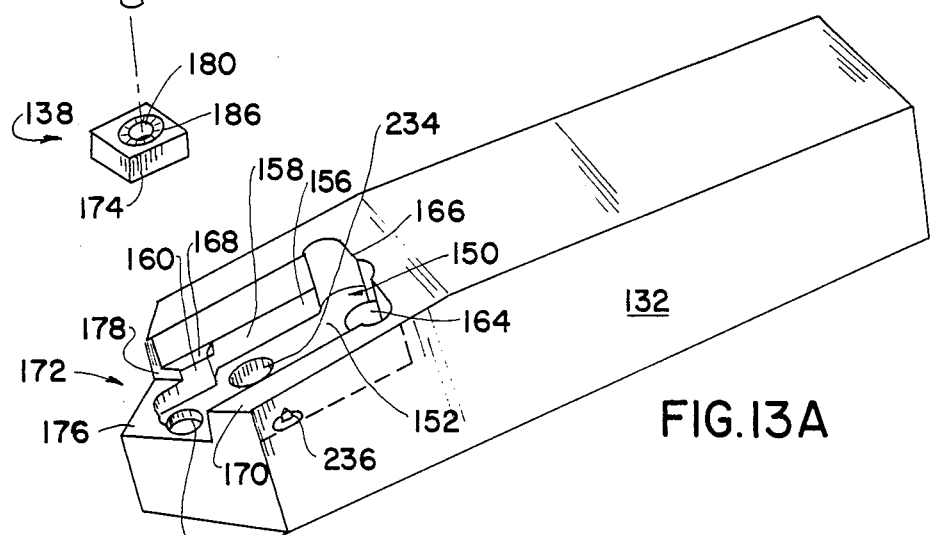
FIG. 13A is an exploded perspective view of the cutting tool and indexing means assembly of FIG. 11 for automatically indexing a cutting tool insert according to the present invention.

Referring to FIG. 11, there is shown a preferred embodiment of a completely assembled cutting tool 130 having a tool holder 132, a cutting tool insert 134 mounted on a fixed seat 138 and secured in the recess of the tool holder 132 by a lock pin 136 as shown in FIG. 13A or by a modified lock pin assembly 137 as shown in FIG. 12. A cam plate 140 is employed for motion along the longitudinal axis of the tool holder 132.

A cam pin 142, adapted to rotate and thereby move the cam plate 140 is secured within a collar 144 while the base 148 of the collar 144 has a shape complimentary to a lateral groove 146 of the cam plate 140 and is moveable therein. The cutting insert 134 is secured on the fixed seat 138 by the modified lock pin assembly 137 and the cutting insert assembly is secured in the recess of the tool holder 132 by the assembly shown in FIG. 12.

Referring the FIG. 13A, the shank 132 includes a cavity 150 bounded atone end by a curved wall 166 and opens into an opposed end for receiving the cutting insert 134. The cavity 150 is disposed generally along the longitudinal axis of the shank 132, having a bottom surface 152 and opened at the top for receiving a sliding key 154. The cavity 150, includes first opposing wall sections 156 having a curved end portion 158 leading to second opposing wall sections 160 inwardly disposed within the cavity 150 from the first wall sections 156 for receiving and locating the sliding key 154.

Disposed in the bottom surface 152 of the cavity 150 and vertically extending through the shank 132 are a first bore 162 for receiving the lock pin assembly 137, and a locking assembly 300, and a second bore 164 for receiving the cam pin 142. The cam pin 142 is secured in the second bore 164 for receiving the cam 164 by conventional means as described in connection with FIG. 2A or, preferably by the assembly shown in FIGS. 15-18. The shank 132 also includes shoulders 168 in conjunction with an upper surface 170 for supporting the cam plate 140 which slides along the longitudinal axis of the shank 132. The head or cutting end of the shank 132 has a cut-out 172 adapted to receive the insert seat 138. Depending on the shape of the seat 138, the cut-out 172 is configured so that side surfaces 174 of the seat 138 may extend slightly beyond the periphery of the shank 132. Surfaces 176 and 178 of the cut-out 172 should be perfectly flat, within, the usual acceptable tolerances, and extend perpendicular to each other. The two surfaces 174 of the seat 138 are held loosely against vertical surfaces 178 of the cut-out 172 by means of the lock pin 136 which extends through a central aperture 180 in the seat 138 and through the first bore 162 in the shank 132. The lock pin 136 may be rotatably secured to the base of the shank 132 by conventional means, e.g., diametrical groove and oval retaining clip, or secured to the shank 132 by the embodiment shown in FIG. 12.

The lock pin 136 shown in FIG. 13A is essentially the same as that described above in connection with the first embodiment of the invention and specifically FIG. 3 or may be replaced by the lock pin assembly 137 shown in FIG. 12. As shown in FIG. 13A, the lock pin 36 is generally cylindrical in shape and includes a serrated portion 182 about the circumference of the lock pin 136 and at the elevation of the cavity 150 of the shank 132 when the pin 136 is installed in the first bore 162. A shoulder 184 is provided about the periphery of the lock pin 136 for engaging the lock pin 136 in the counterbore 186 around the aperture 180 in the seat 138.

The cutting insert 134 is positioned on the seat 138 by extending the lock pin 136 through a central aperture 188 therein. The insert 134 may be secured to the lock pin 136 by means of a screw 190 inserted into a grooved hole 192 in the top of the lock pin 136. The screw 190 has a cylindrical head 194 with a diameter greater than that of the central aperture 188. With the insert 134 thus positioned on the lock pin 136, the screw 190 is threaded into the hole 192 until the head 94 is seated against the top surface 196 of the insert 34 or in an appropriate countersink therein thereby securing the insert 134 against the shoulder 184 of the lock pin 136.

Figure 13C:
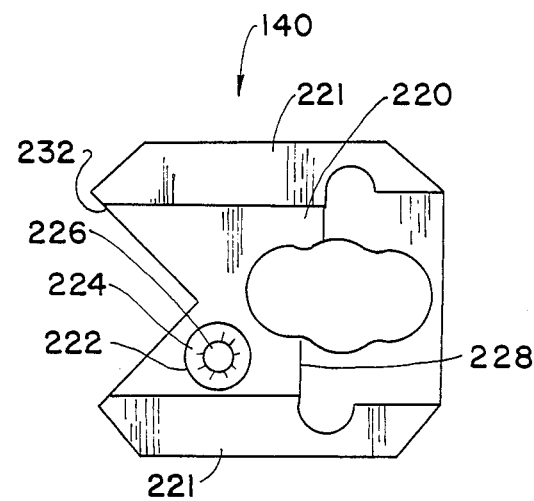
FIG. 13C is a bottom view of an alternative cam plate.

Referring to FIGS. 13A and 13C, the sliding key 154 comprises a body 198 having parallel side walls 200, a pair of indexable legs 202, preferably integral with the body 198, and a vertical recess 204 at the other end of the key 154 having a radius of curvative effective for accomodating the cam pin 142 when the pin 142 is inserted through the second bore 164 of the shank 132.

The body 198 of the sliding key 154 has therein an aperture 206 having insertable therein a rod 208 having opposed conical ends 210a and 210b (see FIG. 13E). The end 210a is movable from a position above the top surface 212 of the body 198 to a position solely within the aperture 206. Similarly, the end 210b as shown in FIG. 13E is movable from within the aperture 206 to a position extending outside the bottom surface 214 of the body 198. Accordingly, the rod 208 is free to move up and down within the aperture 206 in a manner such that only one of the ends 210a and 210b will be above the respective surfaces 212 and 214 at one time.

The bottom surface 214 of the sliding key 154 also includes an H-shaped slot shown generally in FIG. 13E as numeral 216. The H-shaped slot includes parallel opposed grooves 218a and 218b and a transverse groove 219 connecting the two grooves 218a and 218b. The two parallel opposed grooves 218 are cut deeper than the transverse groove 219 and, together with the movement of the rod 208, actuated by the cam pin 142, causes the slidable key 154 to engage the lock pin 136 and thereby index the cutting insert 134. In accordance with the invention, any shaped slot may be employed so long as the parallel opposed grooves are cut deeper than the transverse groove. For example, the slot may also be in the shape of a dumb-bell.

Referring to FIG. 13B, the cam plate 140 has opposed rails 221 which move along the upper surface 170 of the shank 132. The cam plate 140 also has a bottom side 220 having therein a notch 222 including a tapered side wall 224 and a base 226. The shape of the notch 222 is complimentary to the shape of the conical end 210a of the rod 208 and is adapted to receive the end 210a when the rod 208 is raised within the aperture 206. The notch 222 may have the shape shown in FIG. 13B or may be rotated 90° so that the length of the notch 222 is parallel to the longitudinal axis of the cam plate 140 as shown in FIG. 13C.

Figure 13D:
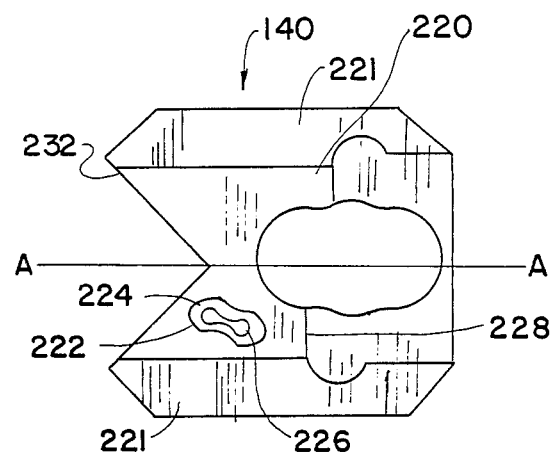
FIG. 13D is a bottom view of a further alterative embodiment of the cam plate.

The notch 222 preferably has an oblong "peanut" shape as shown in FIG. 13D. The notch 222 is angled with respect to the center axis A—A of the cam plate 140. The shape and position of the notch 222 shown in FIG. 13D causes the sliding key 154 to pivot so that the indexable legs 202 may more readily engage or disengage the serrated portions 182 of the lock pin 136.

The bottom side 220 of the cam plate 140 also includes a downwardly extending shoulder 228 which is adapted to engage an upwardly extending ledge 230 (see FIG. 13A) of the sliding key 154 when the cam plate 140 is moved away from the cutting insert 134 by the rotational movement of the cam pin 142.

The indexable legs 202 of the sliding key 154 engage and rotate the lock pin 136 in accordance with the movement of the sliding key 154 as controlled by rotation of the cam pin 142. This relative movement is previously described in connection with FIGS. 6A–6E.

The angled walls 232 of the cam plate 140 provide a secure lock about the cutting insert 134 when the cam pin 142 is in the starting position. In this position, the end 210b of the rod 208 lies within a elongated conical dimple 234 in the bottom wall 152 of the cavity 150 and a spring loaded plunger 236 lies within the rearward groove 218a of the H-shaped 216 in the bottom surface 214 of the sliding key 154.

Rotation of the cam pin 142 disengages the cam plate 154 from the cutting insert 134. The shoulder 228 engages the ledge 230 of the sliding key 154 to cause the sliding key 154 to be moved away from the cutting insert 134. The spring loaded plunger 236 moves upward from the groove 218a into the elevated transverse groove 219. The plunger 236 moves upwardly while the end 210b of the rod 208 lifts out of the dimple 234. Further rotation of the cam pin 142 causes the cutting insert 134 to begin rotating to the position in which the next cutting edge is exposed.

During rotation, the shoulder 228 of the cam plate 140 forces the sliding key 154 backward as far back as possible in the cavity 150. The plunger 236 passes from the transverse groove 219 to the forward groove 218b and the end 210a of the rod 208 enters the notch 222 on the bottom side 220 of the cam plate 140.

As the cam pin 142 is further rotated the new cutting edge is secured in place by the forward movement of the cam plate 140. The walls 224 of the notch 222 force the rod 208 gradually upward thereby moving the slidable-key 154 forward and thereby positioning the indexable legs 202 about the lock pin 136 to complete the cycle. At the same time, the rod 208 is moved forward until the end 210b falls within the dimple 234 and the plunger 236 travels from the groove 218b to the forward groove 218a via the transverse groove 219.

During movement of the sliding key 154 as described above, the indexable legs 202 engage, rotate and then disengage the lock pin 136 as described previously in connection with FIGS. 6–8.

As previously indicated, use of a modified lock pin assembly is preferred. Referring to FIG. 12, the modified lock pin assembly 137 includes a lock pin 260 having a body 262 with a plurality of serrated portions 264 and a flange 266 adapted to engage a shoulder 268 in the fixed seat 138. The lock pin also includes a neck region 270 containing spaced-apart slits 272 to thereby form a plurality, preferably four, of radially expandable fingers 274. The lock pin 260 has therein an axial hole 276 having an opening 278 at the top of the neck region 270.

The axial hole 276 is provided with threads 280 for releasably engaging a screw means 282 inserted within the axial hole 276. The screw means 282 has a tapered neck region 284 which is adapted to be driven downward by suitable drive means, e.g. a torx screwdriver, into the axial hole 276 to thereby spread apart the fingers 274 so that the fingers 274 wedgingly engage the inner surface 286 of the axial hole 288 of the cutting tool insert 134. As a result, the lock pin 260 is secured to the cutting insert 134 and urges the cutting insert 134 laterally against at least one wall of tool holder recess.

The modified lock pin assembly 137 also includes a locking assembly 300 within a counterbore 302 on the underside of the tool holder 132. The locking assembly 300 includes a snap ring 304 secured within a groove 306 in a tail section 308 of the lock pin 260. The tail section 308 extends downward and past the shoulder 310 of the counterbore 302.

A flat washer 312 is placed upon the snap ring 304 and a spring washer 314 is placed upon the flat washer 312. The spring washer 314 is movable from a compressed position wherein it has an upward bowed shape to a more highly compressed position having a substantially flat profile.

In operation, the lock pin 260 is inserted through the insert 134, the fixed seat 138 and into the tool holder 132. The locking assembly 300 is then placed around the tail section 308 of the lock pin 260 within the counterbore 302. The screw means 282 is then driven into the axial hole 276 to thereby spread apart the fingers 274 against the inner surface 286 in the axial hole 288 of the insert 134. At the same time, the screw means 282 creates an upwardly directed axial tension in the locking assembly 300 forcing the spring washer 314 to move to the more highly compressed flattened shape between the flat washer 312 and the shoulder 310 of the counterbore 302.

The spring washer 314 seeks to relieve the tension created in the compressed position by exerting a downwardly directed axial force thereby urging the flange 266 of the lock pin 260 against the shoulder 268 of the fixed seat 138 which in turn is forced against the base of the tool holder recess. As a result, the lock pin assembly 137 serves to effectively secure the cutting insert assembly within the tool holder 132.

The tightening of the cutting insert components within the tool holder 132 can be enhanced by applying pressure axially upward against the tail section 308 while driving the screw means 282 within the lock pin 260. This assures that the spring washer 314 will achieve maximum axial tension on the cutting tool assembly components as previously described.

When the cutting insert 134 is to be replaced, the screw means 282 is loosened and removed from the lock pin 260 thereby relieving the axial tension operating on the spring washer 314 which returns to its bowed less compressed position.

In a preferred form of the invention, the cutting tool 130 includes a rotation control and securing means associated with the cam pin 142 as shown in FIGS. 15–18.

More specifically, the cam pin 142 has an axial hole 320 extending from the top end 322 through the bottom end 324. Within the axial hole 320 is a rotational control pin 326 shown best in FIG. 17. Beneath the control pin 326 is a spring means 328 (e.g. coiled spring) which is movable from an uncompressed position shown specifically in FIG. 15 to a compressed position shown in FIG. 14 when the control pin 326 is forced downward at the start of rotation of the cam pin 142 as explained hereinafter.

The bottom portion of the axial hole 320 is threaded for receiving a screw means 330 which serves to support the spring means 328 and to provide support for a locking means 334 as described hereinafter.

The axial hole 320 in vicinity of the position of the control pin 326 therein has a radially extending passageway 336 for housing a first bearing 338. The passageway has an opening 340 into the axial hole 320 of sufficient size to permit the first bearing 338 to engage the control pin 326. The opposed opening 342 of the passageway 336 is peened or narrowed so that the first bearing 338 may extend only partially out of the opposed opening 342.

Referring to FIG. 17, the rotational control pin 326 includes a relatively thin neck region 344 having a top surface 346 and a body 348 of greater diameter than the neck region 344. The side 350 of the body 348 has an axially extending arcuate channel 352 having a radius of curvature complimentary to that of the first bearing 338 so that the first bearing 338 is able to readily move therein. The channel 352 extends inwardly from the bottom to the top of the body 348. The control pin 326 has a bottom surface 354 engageable by the spring means 328 .

The passageway 336 in the stem 356 of the cam pin 140 is aligned with an arcuate groove 358 of the shank 152 above the second bore 164. The center 360 of the arcuate groove 358 has a radius of curvature complimentary to that of the first bearing 338 but flares outwardly from the center 360 to the ends 362.

As shown best in FIGS. 15 and 18, rotation of the cam pin 142 is commenced by inserting a suitable drive means into the top end 322 of the axial a hole 320 until the rotational control pin 326 is forced downward through the movement of the spring means 328 to the compressed position. This causes the upper portion of the channel 352 to align with the passageway 336 to provide sufficient space for the first bearing to freely move within the stem 356 without interfering with the rotation of the cam pin 142.

When rotation is completed, the drive means is removed thereby allowing the spring means 328 to force the pin upward within the axial hole 320. As a result, the first bearing 338 is forced radially outward in the passageway 336 so that a portion of the first bearing 338 extends outside of the opposed end 342 and engages the center 360 of the groove 358.

In other words, the groove 358 and the channel 352 provide a wedge-like locking action against the first bearing 338 which can only be alleviated by commencing rotation of the cam pin 142 through the use of a suitable drive means.

Figure 14:
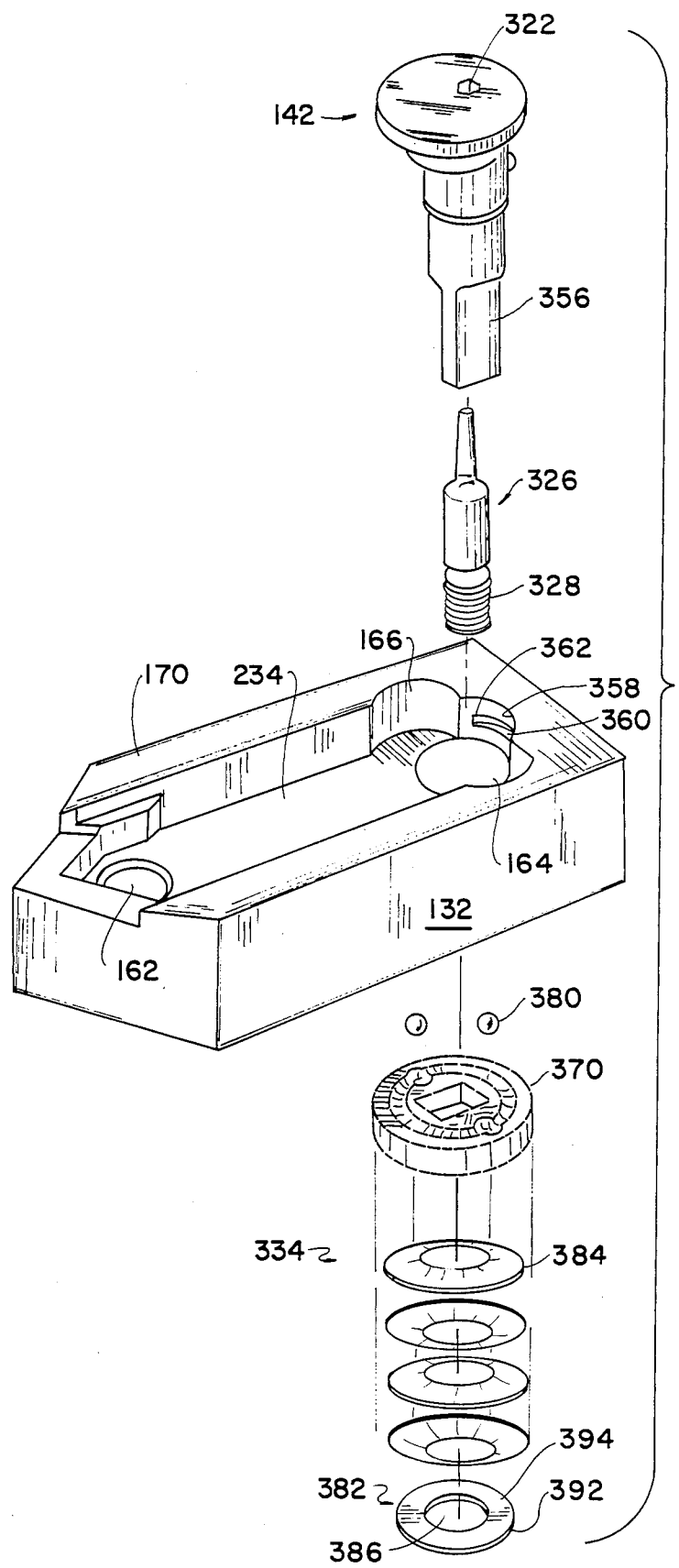
FIG. 14 is an exploded perspective view of the preferred securing and rotational control means of the cam pin shown in FIG. 11.

The present invention is also provided with a locking means 334 that also serves as a tactile indicator of precisely when the cam plate 140 is secured about the insert 134. Referring to FIGS. 14, 15 and 16, the locking means 334 includes a circular plate 370 having a circular raceway 372 including a least one pair of opposed dimples 374 surrounding a rectangular bore 376.

The plate 370 is secured against the shoulder 378 of the counterbore 332 on the underside of the shank 132. The shoulder 378 has opposed dimples so that the combination of the plate 370 and the shoulder 378 provides a pathway in which the stationary bearings may travel during rotational movement of the plate 370 as described hereinafter.

The cam stem 356 exiting into the counterbore 332 is insertable through the bore 376. The plate 370 is secured about the stem 356 by the screw means 330, a flat washer 382, and at least one pair of spring washers 384.

The flat washer 382 has a hole 386 for insertion of the screw means 330. The head 388 of the screw means 330 has a shoulder 390 which abuts against the bottom surface 392 of the flat washer 382. Opposed of spring washers 384 also having a hole 385 therein are placed on the top surface 394 of the flat washer 382. As shown in FIGS. 14 and 15 two opposed pairs of spring washers 384 are employed.

The top most spring washer 384 abuts against the bottom surface 396 of the circular plate 370. The locking means 334 as described is secured in place by driving the screw means 330 into the threaded bottom portion of the axial hole 320 to compress the spring washers 384 between the flat washer 382 and the circular plate 370. The fully secured locking means 330 is shown in FIG. 15.

In operation, when rotation of the cam pin 142 is commenced as previously described, the second bearings 380 rise out of the respective dimples 374 and move along the raceway 372 as the cam pin 142 is rotated. As the cam plate 140 (See FIGS. 6-8 and 13A) is precisely aligned about the cutting insert 134, the second bearings 380 again drop into the dimples 374 which is felt by the user as a change in compression. The user then ceases any further rotation of the cam pin 142 until the need for indexing another cutting edge.

It will be understood from the description of FIGS. 15-18 that components of the indexable cutting tool such as the cam plate, sliding key, and cutting insert assembly have purposely been omitted for the sake of convenience. These drawings should be viewed in conjunction with the other drawings described herein for the purpose of observing the interaction of all components of the invention.

While there has been described herein what is considered to be preferred embodiments of the invention, the invention in its broadest aspects is not limited to the described embodiments and departures may be made therefrom within the scope of the accompanying claims without departing from the principles of the invention and without sacrificing its chief advantages. For example, although square, round and diamond inserts have been described, other multi-surface conventional type cutting inserts may be used such as triangular, or diamond-shaped inserts. Variations of the indexing steps would also have to be employed depending on the number of cutting edges.

Another embodiment of the present invention may include a shaft connected to the cam plate in place of the cam pin. The reciprocating motion of the shaft will provide translation of the cam plate along the longitudinal axis of the shank which would be translated into a rotation of the lock pin through the sliding key.

What is claimed:

1. A cutting tool, comprising:

a shank having an elongated cavity at a cutting end of the cutting tool;

an indexable cutting insert having an axial hole therein, at least one side surface and a plurality of cutting edges;

means rotatably connecting said cutting insert to said shank including a lock pin assembly slidably and rotatably extending through said shank having a ratcheting means about a portion of its length, said lock pin assembly comprising a lock pin having an axial hole therein, a neck portion adapted to engage the inner surface of the insert axial hole and having a plurality of axial slits defining spaced-apart radially movable portions, screw means insertable into the axial hole of the lock pin and adapted to spread apart the radially movable portions into pressing engagement with the inner surface of the indexable insert to thereby secure the lock pin to the insert and to urge the insert in pressing engagement with the shank;

a seat adapted to said shank for supporting said insert;

means to secure said cutting insert on said seat in a cutting position comprising a plate movably mounted to said shank having a pocket for engaging the side surface of the insert in the cutting position; and means to index said cutting insert adapted to cooperate with said ratcheting means of said lock pin and with said movable plate;

said indexing means being effective for rotating said cutting insert upon withdrawing said movable plate from said insert which pushingly engages said indexing means in said cavity of said shank wherein said indexing means cooperate with said ratcheting means to effect a first partial rotation of said lock pin and said cutting insert attached thereto then retracting said movable plate and said indexing means to again cooperate with said ratcheting means to effect a second partial rotation of said lock pin and said cutting insert, then further retracting said movable plate to secure said cutting insert in the cutting position.

2. The cutting tool of claim 1 wherein the lock pin further comprises a flange adapted to engage a shoulder in an axial hole in the seat, said cutting tool further comprising means for exerting axial tension by the flange on the shoulder of the seat to thereby secure the seat to the shank.

3. The cutting tool of claim 2 wherein the lock pin further comprises a tail section extending into a counterbore in the underside of the shank, said counterbore having as shoulder, said axial tension means comprising a spring washer mounted about the tail section of the shank and having a top surface adapted to engage the shoulder of the counterbore and means for moving the spring washer from a compressed position to a more highly compressed position against the shoulder thereby exerting an axial downward force on the seat against the shank.

4. The cutting tool of claim 3 wherein the means for moving the spring -washer comprises a snap ring mounted in a circumferential groove in the tail section of the lock pin, a flat washer on the snap ring having a top surface for engaging the spring washer.

5. The cutting tool of claim 1, wherein said elongated cavity has a bottom wall, opposing side walls and substantially curved end walls for receiving said indexing means, a first bore at one end of the cavity extending vertically through said shank for receiving said lock pin and a second bore at the other end of said cavity extending vertically through said shank for receiving a means for moving said movable plate.

6. The cutting tool of claim 1, wherein said ratcheting means of said lock pin includes a plurality of serrated teeth symmetrically spaced about the circumference of said lock pin, said teeth being oriented so as to include an angle between adjoining teeth.

7. The cutting tool of claim 3, wherein said indexing means comprises a sliding key having substantially parallel side walls, a longitudinal axis spaced therebetween, front and rear walls, a pair of indexable legs mounted to the front wall for engaging said ratcheting means of said lock pin, said key slidably positioned within said cavity of said shank for allowing withdrawing and retracting in a direction substantially parallel to said longitudinal axis.

8. The cutting tool of claim 7, wherein said pair of indexable legs are substantially parallel and extend about the ratcheting means of said lock pin, the first of said pair of indexable legs having a length less than the length of the second of said pair of indexable legs.

9. The cutting tool according to claim 8, wherein the indexable legs are integrally attached to the sliding key.

10. The cutting tool according to claim 1, wherein the sliding key further- comprises an axial hole therein, a rod having opposed conical ends and being movable within the axial hole, said elongated cavity having a corresponding hole in the forward end therein, said plate having a corresponding hole in its forward end, wherein when the sliding key moves forward in the cavity of the shank the bottom end of the rod enters the hole in the cavity and when the sliding key is retracted the rod exits the cavity hole and the top end of the rod enters the hole in the plate to enable the plate to retract the sliding key.

11. The cutting tool of claim 10 further comprising a slot on the bottom surface of the sliding key and spaced apart from the rod-containing axial hole, the slot comprising a pair of opposed parallel grooves and a transverse groove connecting the parallel grooves through a gradual downwardly tapered wall, the opposed parallel grooves having a depth greater than the transverse groove, the cavity of the shank having extending upwardly therefrom a spring loaded projection adapted to reversibly move from one of the parallel grooves to the other through the transverse groove in concert with the movement of the slidable key.

12. The cutting tool of claim 1, further comprising means for preventing rotation of the cam pin and movement of the movable plate after the movable plate has been secured about the insert.

13. The cutting tool of claim 12, wherein the rotation preventing means comprises, said cam pin having an axial hole containing a spring means and an axially movable pin therein, a passageway extending radially from the axial hole to a peened opening on the outside surface of the cam pin, said movable pin having a arcuate channel tapered outwardly from the top to the bottom of the pin and being aligned with the radially extending channel, a bearing adapted to be movable in said passageway when the pin is pushed downwardly in said cam pin, and said bearing being wedgingly locked in the passageway when the pin is in the upright position.

14. The cutting tool of claim 13, wherein the cam pin rotation preventing means further comprises a lateral groove in the second bore of the elongated cavity having a gradually greater depth toward the center and being alignable with the peened opening of the passageway in the cam pin, wherein when the movable pin is pushed downward thereby commencing rotation of the cam pin the bearing is free to move in the passageway, and when the movable pin is allowed to move upward, the arcuate channel forces the bearing radially in the passageway so that a portion of the bearing protrudes from the peened hole and wedgingly engages the lateral groove in the second bore.

15. The cutting tool of claim 1, further comprising means for detecting when the movable plate is secured about the insert.

16. The cutting tool of claim 15, wherein the detecting means comprises a plate mounted about the cam pin in a counterbore on the underside of the shank, a circular groove on the surface of the plate having at least one pair of opposed dimples therein having a depth greater than the depth of the groove, a corresponding pair of opposed dimples on the underside of the shank, at least one pair of second bearings movable in the groove and dimples upon rotation of the cam pin and means for securing the plate to the underside of the shank wherein when the cam pin is rotated the bearings move in the circular groove and when the cam plate is precisely aligned with the insert the bearings enter the dimples thereby generating a change in compression detectable by the user of the cutting tool.

17. The cutting tool of claim 16, wherein the means for securing the plate to the counterbore in the underside of the shank comprises screw means insertable into the axial hole of the cam pin, a flat washer engageable by the screw means having thereon at least one pair of opposed spring washers adapted to engage the plate mounted about the cam pin, the spring washers being movable from a compressed position to a more highly compressed position against the plate when the screw means is driven into the axial hole of the cam pin.

18. The cutting tool of claim 1, wherein said cutting edges are symmetrically spaced around said insert.

19. The cutting tool of claim 18, wherein said insert has a square shape.

20. The cutting tool of claim 18, wherein said insert has a equilateral triangular shape.

21. The cutting tool of claim 18, wherein said insert has a circular shape.

22. The cutting tool of claim 18, wherein said insert has a diamond shape.

23. The cutting tool of claim 1 wherein said movable plate further comprises a central longitudinal aperture and a lateral slot, said cutting tool further comprising a cam pin insertable into said aperture and having an eccentric head attached thereto, said eccentric head having a diameter equal to the breadth of said lateral slot so as to engage said slot upon rotation of the cam pin to effect translation of the movable plate.

* * * * *

UNITED STATES PATENT AND TRADEMARK OFFICE
CERTIFICATE OF CORRECTION

PATENT NO. : 4,848,199

DATED : July 18, 1989

INVENTOR(S) : Walter H. Kelm

It is certified that error appears in the above-identified patent and that said Letters Patent is hereby corrected as shown below:

```
Column 16, line 29, before "slidably" insert -- being --.

Column 16, line 65, "1" should read -- 23 --.

Column 17, line 1, before "rotation" insert -- cam pin --.

Column 17, line 27, "1" should read -- 23 --.
```

Signed and Sealed this

Twenty-second Day of May, 1990

Attest:

HARRY F. MANBECK, JR.

*Attesting Officer*  *Commissioner of Patents and Trademarks*